US006256444B1

(12) United States Patent
Bechamps et al.

(10) Patent No.: US 6,256,444 B1
(45) Date of Patent: Jul. 3, 2001

(54) ADJUSTABLE GUIDE FOR ORGANIZING OPTICAL FIBERS IN AN EQUIPMENT RACK

(75) Inventors: Ronald D. Bechamps, Robbinsville; William S. Leib, III, Tinton Falls, both of NJ (US)

(73) Assignee: Antec Corporation, Duluth, GA (US)

( * ) Notice: Subject to any disclaimer, the term of this patent is extended or adjusted under 35 U.S.C. 154(b) by 0 days.

(21) Appl. No.: 09/400,215

(22) Filed: Sep. 21, 1999

(51) Int. Cl.[7] ....................................................... G02B 6/00
(52) U.S. Cl. ............................................. 385/134; 385/136
(58) Field of Search .................................... 385/134, 135, 385/136; 379/327, 328, 329

(56) References Cited

U.S. PATENT DOCUMENTS

| 4,776,662 | * | 10/1988 | Valleix | 385/134 |
| 5,142,606 | * | 8/1992 | Carney et al. | 385/134 |
| 5,487,123 | * | 1/1996 | Fowble | 385/137 |
| 5,758,002 | * | 5/1998 | Walters | 385/134 |

* cited by examiner

Primary Examiner—Cassandra Spyrou
Assistant Examiner—Euncha Cherry
(74) Attorney, Agent, or Firm—Troutman Sanders LLP; Gerald R. Boss

(57) ABSTRACT

An apparatus for organizing fibers in a rack that houses optical equipment, including a guide that can be removably connected at one of a plurality of different locations to define paths in which fibers can be routed between equipment within the rack. The invention includes a panel having an array of mounting holes therein, and a plurality of guides that can be removably connected to the panel at a plurality of different locations defined by the mounting holes. The panel is located in the rack adjacent to each rack space that houses a piece of equipment and preferably includes a plurality of columns having a plurality of mounting holes in each column. This provides a plurality of vertical and horizontal locations at which a guide can be connected to the panel, thereby allowing the guide to be connected to an appropriate location depending on the size of the equipment in the rack space.

1 Claim, 3 Drawing Sheets

ADJUSTABLE GUIDE FOR ORGANIZING OPTICAL FIBERS IN AN EQUIPMENT RACK

FIELD OF THE INVENTION

The invention relates generally to racks for mounting optical communications equipment, and more specifically, to an adjustable guide for routing fiber traffic in such racks.

BACKGROUND OF THE INVENTION

Communications systems, such as cable television and telephone systems, utilize fiber optics technology. In optical systems, many different types of equipment are utilized, and the various equipment is frequently housed in racks. These racks may house optical equipment such as laser transmitters, optical couplers, splice shelves, and optical pretermination units, as well as various other types of equipment. The racks typically have a number of rack spaces in which the equipment is mounted, with the rack spaces typically being arranged vertically in the rack. Each rack space is typically standardized to fit a unit of a predetermined size. For example, each rack space may be dimensioned to house a piece of equipment that is 7 inches high, as is common in the art. Many different connections are typically made between these various pieces of equipment in a rack, and also between the equipment in the rack and equipment in other racks located nearby. Therefore there are many optical fibers leading to and from the equipment in the rack.

With the many optical fibers connecting equipment in the rack, there is a need to organize the fibers as they run to and from the equipment. Prior organizing devices include a metal spool-shaped member mounted at a fixed location adjacent each rack space. Each spool allows the fibers entering or exiting the equipment housed in a rack space to be laid on the spool and directed toward its intended destination. However, a drawback of this current implementation is that the spool is located at a fixed position adjacent to each rack space. Because some equipment housed in the rack space may be a different height than other equipment, the fixed spool is often located at an improper position relative to such equipment, thus making it difficult or impossible to use the fixed spools to organize the fibers entering or exiting the equipment.

Therefore, a need exists in the art for an adjustable device that can be positioned at one of a plurality of different locations such that the device can be positioned according to the size of the equipment housed in the rack.

SUMMARY OF THE INVENTION

The present invention is an apparatus for organizing fibers in a rack that houses optical equipment. The present invention includes a guide that can be removably connected at one of a plurality of different locations to define paths in which fibers can be routed between equipment within the rack. The invention includes a panel having an array of mounting holes therein, and a plurality of guides that can be removably connected to the panel at a plurality of different locations defined by the mounting holes. The panel is located in the rack adjacent to each rack space that houses a piece of equipment. Each guide includes a body that is generally circular or oval in cross-section, and a retaining plate which is connected to the body and extends beyond the periphery of the body. The retaining plate prevents any optical fibers resting on the body of the guide from slipping off the front edge of the guide.

In the preferred embodiment of the present invention, the array of mounting holes adjacent each rack space includes three columns having five mounting holes in each column. This provides a plurality of vertical and horizontal locations at which a guide can be connected to the panel, thereby allowing the guide to be connected to an appropriate location depending on the size of the equipment in the rack space.

DETAILED DESCRIPTION

The present invention is directed to an apparatus for organizing fibers in an equipment rack. The apparatus includes a guide that can be removably connected at one of a plurality of different locations within an equipment rack that houses optical equipment. The guide is removably connected to a panel located adjacent to the optical equipment so that optical fibers, such as jumpers routed between various equipment in the rack, can be organized and kept free from entanglement and damage.

Figure 1:
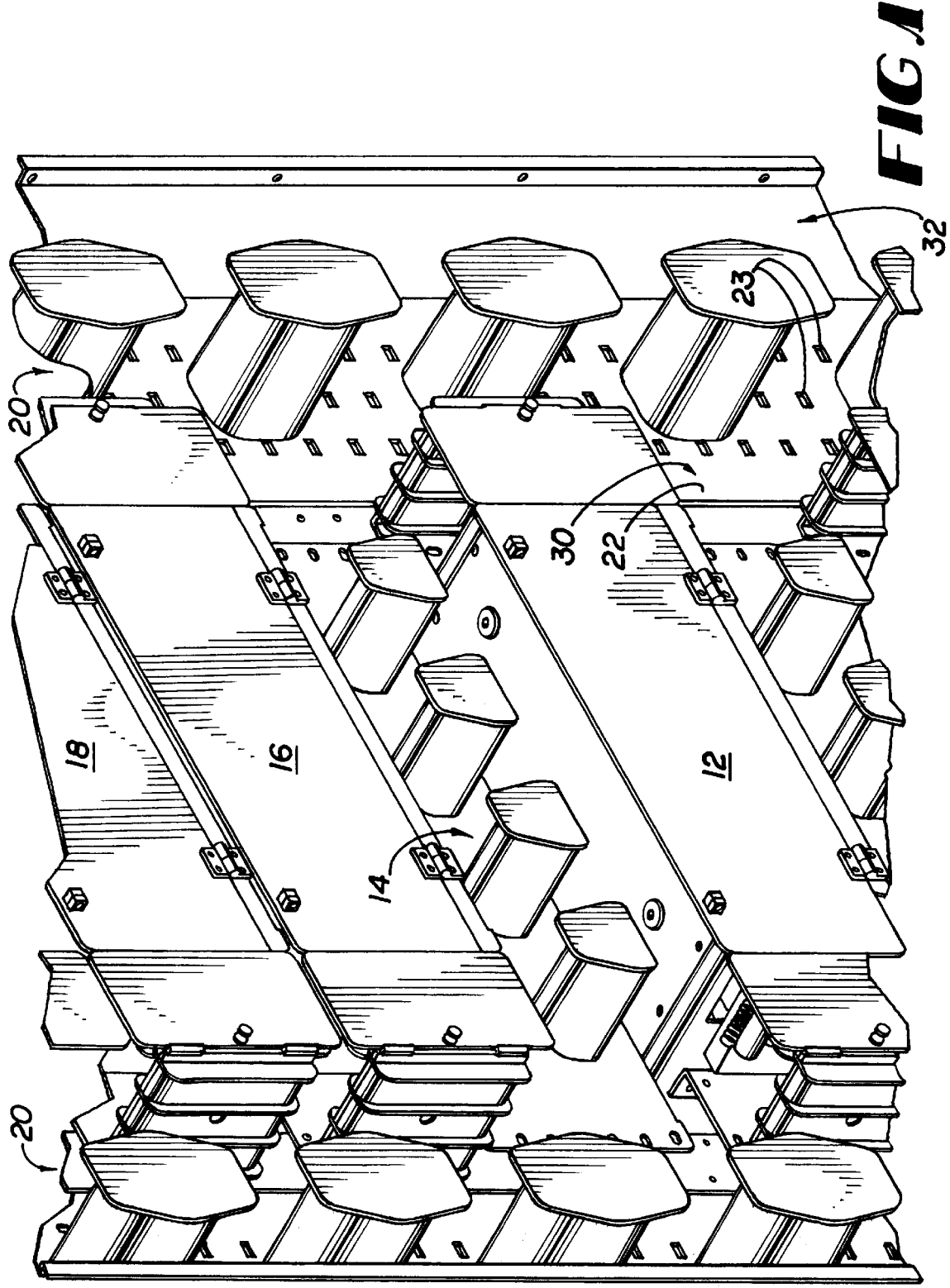
FIG. 1 is a front perspective view of a rack for housing optical equipment therein, which shows the panel, array of mounting holes, and guides in accordance with the present invention.

A perspective view of an equipment rack including the present invention is shown in FIG. 1. The rack 10 includes a plurality of rack spaces 12, 14, 16, and 18, arranged vertically. In FIG. 1, rack space 14 has a panel having fixed guides thereon, to guide fibers that are crossing from one side of the rack to the other. Various equipment, such as optical transmitters, optical couplers, splice shelves, optical pretermination units, etc. may be housed in the rack spaces.

In the rack, preferably on each side of each rack space, is provided a fiber organization region 20 in which fibers are routed up and down the rack between equipment. It should be understood that for purposes of this disclosure, the term "fiber" is meant to encompass fiber optic cable having multiple fibers therein, as well as individual optical fibers, pigtails, jumpers, or any other type of medium for carrying optical signals. However, the present invention may also be used in applications other than a fiber optic application, so the term "fiber" may also encompass other signal transmission media, such as coaxial cable and other electrical cables.

Figure 2:
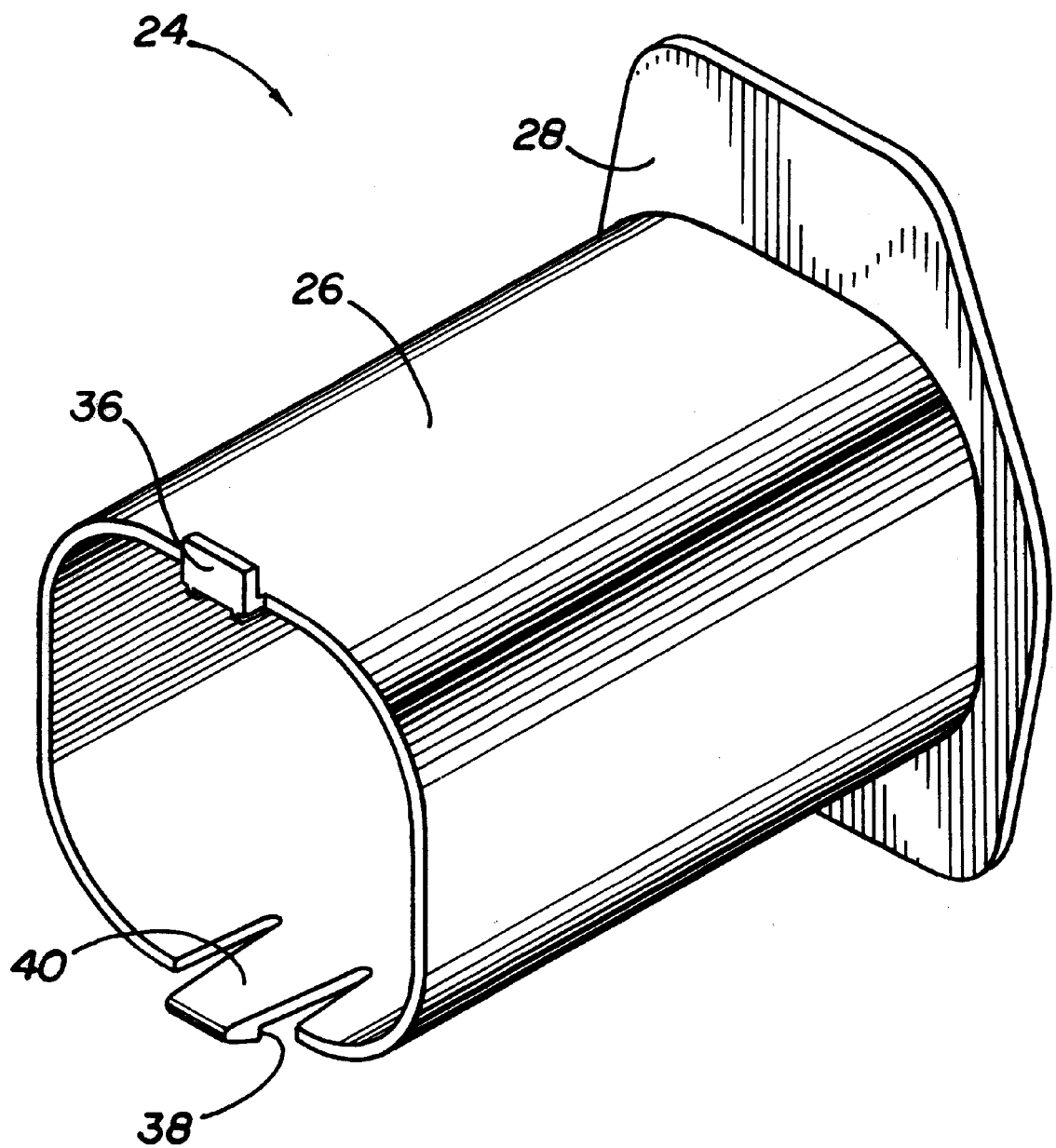
FIG. 2 is a perspective view of the guide used in accordance with the present invention.

Each organization region 20 provides adequate space for organizing the fibers that enter and exit the various equipment. As shown in FIG. 1, each organization region includes a panel 22 having an array of mounting holes 23 therein, and a plurality of guides 24 that can be removably connected to the panel at one of a plurality of different locations defined by the mounting holes. As shown in FIGS. 1 and 2, each guide 24 includes a body 26 that is generally circular or oval in cross-section, and a retaining plate 28 which is connected to the body and extends beyond the periphery of the body. The retaining plate prevents any optical fibers resting on the body of the guide from slipping off the front edge of the guide.

Typically, optical fibers are connected to connectors on the front face of the equipment housed in each rack space. These optical fibers then exit each rack space horizontally, away from the equipment and into the organization region. These fibers can then be routed to other equipment in the same rack, or the fibers can be routed to equipment located in another rack. Because multiple fibers can be connected to each piece of equipment in the rack, many fibers are routed throughout the rack. Therefore, the need to organize the fibers in some manner is required to prevent the numerous different fibers from becoming tangled or otherwise unmanageable.

As described above, guides 24 are removably connected to the panel 22 via mounting holes 23. As shown in FIG. 1, the guides define two lanes of fiber traffic: an inner lane 30 and an outer lane 32. The inner lane 30 is between the rack space and the guides, and the outer lane 32 is between the guides and the outside of the rack. If a fiber is to be directed to equipment in an immediately-adjacent or a nearby rack space, the fiber can use the inner lane without being passed over the guide. If the fiber is to be directed to equipment in a more distant rack space, the fiber can be routed in the outer lane 32 by being passed over the upper surface of the guide and then downward toward the bottom of the rack. Similarly, the fiber can be routed upwardly by being routed under the bottom surface of a guide that is immediately above the rack space. The benefit of providing two lanes of fiber traffic is that fibers can be directed to the outer lane and thereby be removed from the inner lane, where there is fiber congestion from multiple fibers entering and exiting rack spaces.

The location of each guide 24 on the panel 22 is adjustable. The panel 22 preferably extends horizontally between the rack space and the outer wall of the rack, and preferably extends vertically the length of the rack, as shown in FIG. 1. The array of mounting holes 23 is arranged such that each guide can be removably connected to mounting holes in one of many different locations. The advantage of being able to selectively position each guide is that not all equipment housed within a rack space is the same height, and therefore the guides may need to be adjusted to be located at the proper position for different types of equipment. For example, a rack space may be dimensioned to accept equipment that is 7 inches high, but other equipment housed in the rack space may be less than 7 inches in height. In prior systems, the guide was permanently positioned for a 7 inch unit, thus making the guide improperly placed for any other size unit. The present invention solves this problem.

An example of a guide used in accordance with the present invention is shown in FIG. 2. The guide 24 includes a body 26 and a front retaining plate 28. The guides are of a sufficient dimension and strength to be able to support numerous fibers resting thereon. Also, the upper and lower surfaces of the body of each guide are convex to ensure that the minimum bend radius of the fibers is maintained, and the convex surface also reduces the chafing of each fiber against the upper surface of the guide, thereby minimizing possible damage to the fibers.

The body of each guide has a hook 36 and a deformable snap 38, which are preferably located on opposite sides of the body. Preferably, the body is made of plastic, and is formed from two opposing pieces of injection molded plastic that are ultrasonically welded together, as is well known in the art. The body can then be ultrasonically welded to the front retaining plate.

The hook and snap allow the guide to be removably connected to the mounting holes in the panel 22. The hook 36 is placed in one mounting hole, and the snap 38 is snap-fitted into another mounting hole. To disconnect the guide from the panel 22, the snap is deflected toward the interior of the guide body by pressing on deformable member 40 such that the head of the snap can be pulled out of the mounting hole. Then, the hook can be removed from the other mounting hole, thereby disconnecting the guide from the panel. However, it will be understood that the guide may include other alternative structure for connecting the guide to the panel, and the present invention is not limited to the guide as shown in FIG. 2.

The mounting holes 23 are arranged in an array such that the guide can be positioned in a plurality of positions adjacent to a rack space. This is best seen with reference to FIG. 3. For the sake of simplicity, only one of the panels is shown, but it should be understood that another similar or identical panel is located on the opposite side of the rack spaces. In the preferred embodiment of the present invention, the array of mounting holes 23 adjacent each rack space includes three columns having five holes in each column. Each guide 24 can be removably connected to the panel using two mounting holes in the same column separated by one hole. This means that a guide will cover three vertical holes when connected to the panel. This is seen in FIGS. 1 and 3, where it should be understood that the guide can be positioned in one of three different horizontal positions, and in one of three vertical positions relative to each rack space, for a total of nine possible positions within the holes adjacent to a single rack space.

Figure 3:
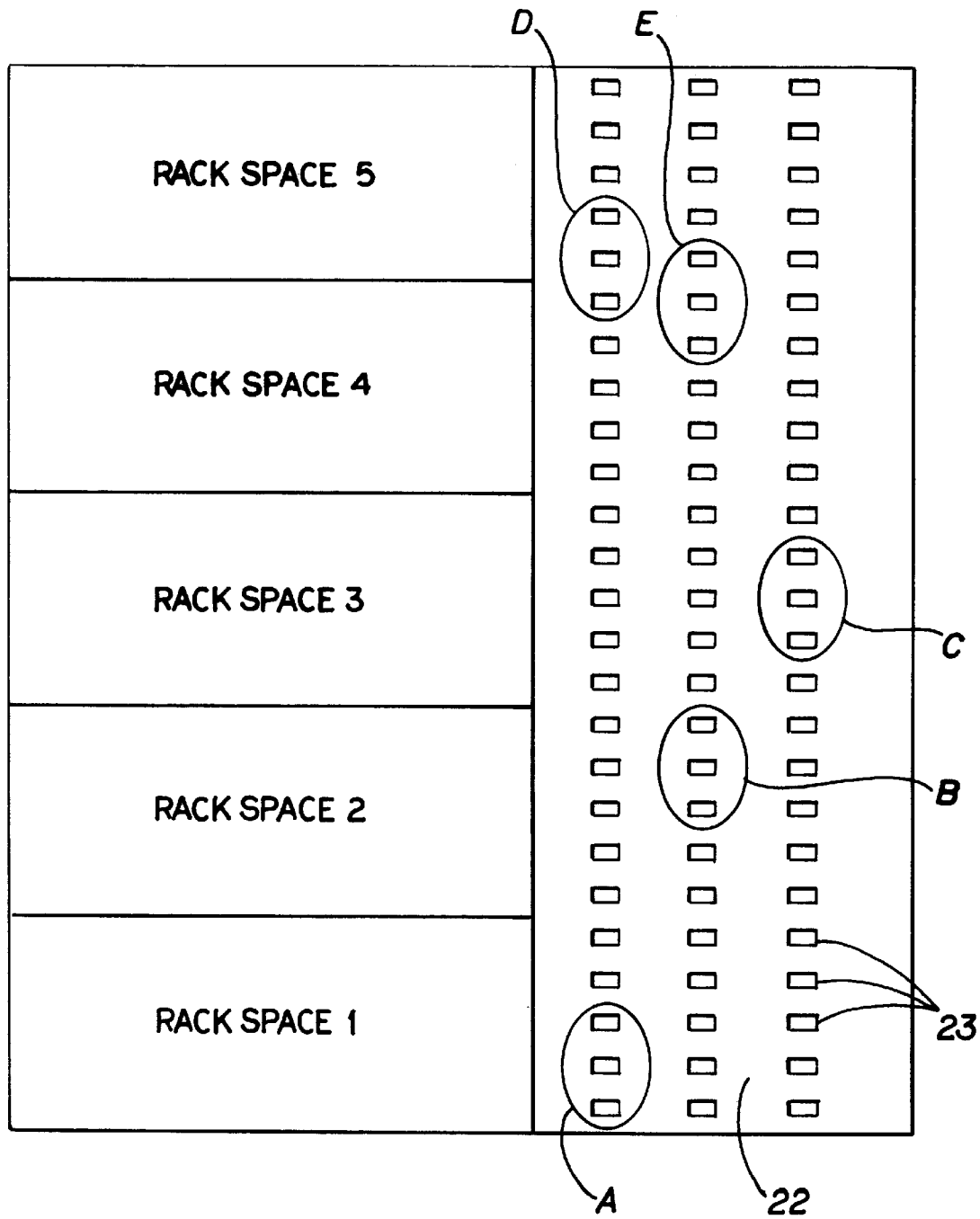
FIG. 3 is a diagram showing the array of mounting holes adjacent each rack space to which the guides can be mounted in accordance with the present invention.

Preferably each of the mounting holes in each column are linearly aligned and adjacent mounting holes are equally spaced from each other, as shown in FIGS. 1 and 3. Preferably, each of the mounting holes in each row are also linearly aligned and adjacent mounting holes are also equally spaced from each other. In this manner, a guide can be positioned in many different locations by selecting appropriate mounting holes in which to mount the guide. It will be understood that because the footprint of the guide covers three holes, when the guide is moved down by one hole, this equates to being moved downward approximately half the footprint of the guide, i.e., a half-space. This enables the guide to be selectively located on the panel with precision.

FIG. 3 shows examples of such locations. Guide A is located at the bottom left of the array adjacent to rack space 1, where "bottom" refers to the vertical location and "left: refers to the horizontal location of the guide relative to a single rack space. Guide B is located at the top middle relative to rack space 2. Guide C is located at the middle right relative to rack space 3. As described above, there are nine possible locations for the guide in the mounting holes adjacent to each rack space.

Additional locations can be obtained by overlapping the guide between adjacent rack spaces. For example, guide D overlaps rack space 4 into rack space 5 by two mounting holes. Similarly, guide E overlaps rack space 4 into rack space 5 by one mounting hole. In this manner, six additional guide locations are provided as overlap positions between each adjacent rack space. Therefore, based on the array of the preferred embodiment of the present invention, 15 guide locations are provided for each rack space. This array ensures that an adequate location for each guide can be found for a piece of equipment of any size housed within a rack space. Of course, an array having a different alignment or number of mounting holes can be used to achieve the same objectives, and the present invention should not be construed to be limited to the array shown herein.

While the preferred embodiments of the invention have been shown and described, it will be obvious to those skilled in the art that various modifications and alterations can be made thereto without departing from the spirit and scope of the invention as defined in the appended claims.

What is claimed is:

1. An optical fiber organizer for organizing optical fibers extending to and from a rack, the rack having a plurality of rack spaces in which equipment is housed, comprising:

a panel having an array of mounting holes therein said panel for being located adjacent to a rack space;

said panel having a first plurality of mounting holes arranged in a first vertical orientation;

said panel having a second plurality of mounting holes arranged in a second vertical orientation and also being laterally offset from said first plurality of vertical mounting holes;

said panel having a third plurality of mounting holes arranged in a third vertical orientation, said third plurality of vertical holes being laterally offset from said second plurality of vertical mounting holes;

a guide removably connected to said panel oriented in a plurality of locations on said panel using said first and second vertical mounting holes, or said second and third vertical mounting holes;

wherein said guide being positioned in multiple configurations both vertically and laterally with respect to said panel;

wherein said plurality of mounting holes are configured for allowing said guide to be removably connected with a vertical offset and a lateral offset in proportion to the height and width of said equipment housed in said rack for routing optical fiber.

* * * * *